United States Patent [19]
Goldys et al.

[11] Patent Number: 6,067,506
[45] Date of Patent: May 23, 2000

[54] SMALL COMPUTER SYSTEM INTERFACE (SCSI) BUS BACKPLANE INTERFACE

[75] Inventors: John J. Goldys; Charles T. Bloomer, both of Beaverton, Oreg.

[73] Assignee: Intel Corporation, Santa Clara, Calif.

[21] Appl. No.: 09/002,259

[22] Filed: Dec. 31, 1997

[51] Int. Cl.⁷ .................................................. G06F 13/36
[52] U.S. Cl. ........................... 702/117; 710/103; 714/25; 714/43; 714/44
[58] Field of Search ................................. 702/117, 118, 702/120, 122, 186; 395/182.03, 183.01, 184.01, 280, 281, 282, 283, 287, 835, 882; 710/103; 714/25, 43, 44

[56] References Cited

U.S. PATENT DOCUMENTS

| | | | |
|---|---|---|---|
| 5,033,049 | 7/1991 | Keener et al. | 371/23 |
| 5,257,393 | 10/1993 | Miller | 395/800 |
| 5,495,584 | 2/1996 | Holman, Jr. et al. | 395/308 |
| 5,515,515 | 5/1996 | Kennedy et al. | 395/283 |
| 5,564,024 | 10/1996 | Pemberton | 395/283 |
| 5,572,685 | 11/1996 | Fisher et al. | 395/287 |
| 5,579,491 | 11/1996 | Jeffries et al. | 395/283 |
| 5,602,989 | 2/1997 | Aria | 395/183.19 |
| 5,644,705 | 7/1997 | Stanley | 395/183.18 |
| 5,664,119 | 9/1997 | Jeffries et al. | 395/283 |
| 5,758,101 | 5/1998 | Pemberton | 395/283 |
| 5,812,797 | 9/1998 | Crane, Jr. et al. | 395/306 |
| 5,822,551 | 10/1998 | Crane, Jr. et al. | 395/307 |
| 5,835,700 | 11/1998 | Carbonneau et al. | 395/183.2 |
| 5,862,350 | 1/1999 | Coulson | 395/283 |

*Primary Examiner*—Patrick Assouad
*Attorney, Agent, or Firm*—Blakely, Sokoloff, Taylor & Zafman LLP

[57] ABSTRACT

A SCSI bus backplane interface coupled between a host system and a SCSI bus backplane is used to functionally test the backplane. The interface allows the backplane to be disconnected and exchanged for another backplane while avoiding interruption of the operation of the host system and avoiding powering down a cluster of drives present at the interface. The interface intercepts the SCSI bus termination signal during backplane exchange and re-establishes it to the drives (the SCSI bus) after the exchange is made. Complete isolation between the host system, the backplane, and the drives during power cycling permits the backplane to be exchanged without damage. Host system BIOS reboot recognition of the drives is not required each time the backplane is replaced, or to establish the number of active drives to functionally test each backplane after replacement. Test time is therefore reduced.

31 Claims, 4 Drawing Sheets

SMALL COMPUTER SYSTEM INTERFACE (SCSI) BUS BACKPLANE INTERFACE

BACKGROUND OF THE INVENTION

1. Field of the Invention

The present invention relates generally to the field of servers, and more particularly, to electronic test support for server backplanes.

2. Description of Related Art

Buses are widely used to connect components of a computer system. The small computer system interface ("SCSI") bus, along with its SCSI bus backplane, both of which are integral parts of a SCSI system, offer superb capability. The SCSI system is a system level interface that provides an input/output (I/O) channel bus specification. A SCSI host adapter board in a computer or host system serves to connect the host bus to the SCSI bus. The SCSI system can be used with a wide variety of peripheral devices, such as hard disk drives, floppy disk drives, CD-ROM drives, scanners, and the like, and also host system and satellite SCSI controllers. The hard disk drives could be large memory capacity SCSI-compatible hard drives. The devices will be collectively referred to hereinafter as "drives."

The SCSI system is also expandable. A number of the drives can be added to the system without occupying multiple host bus slots. For example, the SCSI system may be used to couple a multiple number of drives to the host computer system. Moreover, the SCSI system offers a more general drive interface compared to prior specialized interfaces. For example, the SCSI system supports several important features, including drive daisy-chaining, and the issuance of high-level commands via a command block.

The SCSI bus can communicate with several of the different drives simultaneously. The SCSI bus, however, does not communicate directly with the drives themselves. Instead, the drives may be serviced by the SCSI controller (e.g., an interface board or a chip) in the host system that may connect up to 6 or more of the drives. The SCSI controller is an intelligent controller that contains drive software drivers for the various drives attached to the SCSI bus. Alternatively, the SCSI bus may communicate with SCSI controllers built into each of the drives. Drives having controllers mounted in or on the drives themselves are referred to as SCSI drives.

In the SCSI system, for the drives to work properly, the first (e.g., the SCSI controller) and the last drives, or a SCSI drive daisy-chain (if used) must be "terminated." Termination is usually accomplished by setting a jumper switch on the drive or by installing termination blocks. Termination may also be set via software. Regardless of the specific implementation, however, active termination is implemented using a low voltage level termination signal sent from the host system to the terminated drive via the SCSI bus. When daisy-chaining drives, the termination for a drive positioned in the middle of the chain needs to be defeated before proper operation can begin. If a drive has not been terminated properly, all of the drives in the chain will perform unreliably or not at all.

The SCSI bus can be driven with either single-ended or differential line drivers. In both cases, the bus typically has 50/68 lines or 80 lines for hot swap drives (described below). The typical SCSI bus will carry signals such as termination, power, attention, busy, acknowledged, reset, message, select, C/D (control/data), request, and I/O, and includes datalines, a data parity line, and ground lines. In the single-ended system, ground lines are alternated with signal lines, and in the differential system, even and odd lines form differential signal pairs. The host system uses a command to the drive via a command descriptor block, that specifies an opcode, a logical unit number (LUN) of the drive and block address, a length control byte and a control byte. The control byte has a feature that allows multiple commands to be sent in a single block. The drives interpret and perform the SCSI command sent by the controller. Every SCSI command returns a status byte, each bit of which has a specific meaning (good, busy, etc.).

The SCSI bus backplane may be a circuit card assembly included in low to high range server products. The SCSI backplane forms an integral part of a chassis of the host system. The backplane provides signals and pathways between the host system and up to six (or more) interconnected SCSI drives. The backplane functions to control the drives and to log system data. The SCSI backplane provides a power, command/control, and SCSI bus signal interface to the drives. For configurations having the SCSI controller in the host system, the backplane receives control signals from the SCSI controller over a SCSI controller channel in the SCSI bus. The backplane also features simplified cable management and SCA connectors to simplify inserting and removing the SCSI drives.

The backplane typically features the ability to replace the drives while the host system power remains on. This is referred to as drive "hot swapping." Hot swapping involves automatically detecting drive presence, turning off or disconnecting power to the drive, removing it, replacing it with another drive, automatically detecting the other drive's presence, and sequencing power-on to the other drive by a delay ramp function. However, if a drive type is changed, for drive identification purposes, the host system must be powered down and powered up again to run a host system basic input/output system ("BIOS") program so that the new drive will be recognized. The boot-up procedure for the computer system includes diagnostic messages regarding the SCSI drives.

In the SCSI system, drive status is monitored to detect drive failure and to control LED indicators. Green and amber LEDs may be included on the SCSI adapter card in the host system for each drive to indicate the current state of the drive. The backplane provides SCSI management of the LEDs, which may be used to indicate, for example, drive activity/inactivity, drive failure, drive removal or that the drive should not be removed, drive defective, or that no power is or may be supplied to the drive, or that the drive can be safely hot swapped.

Figure 1:
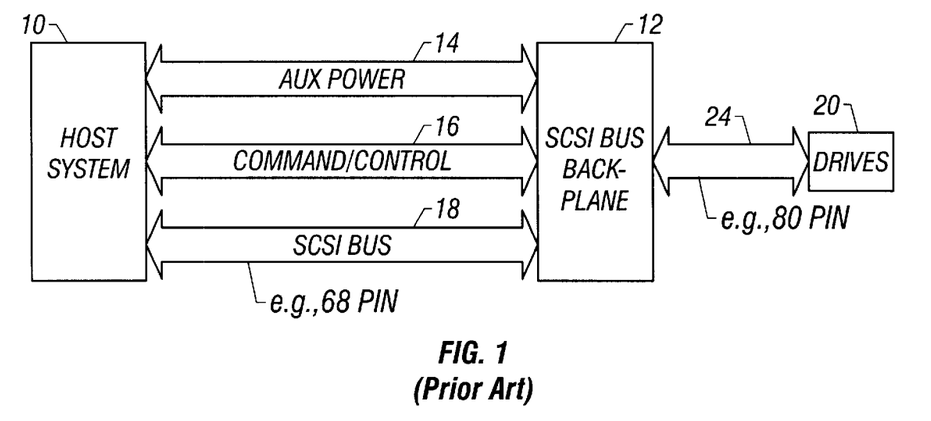
FIG. 1 is a block diagram of a prior art SCSI hot swap system.

Referring now to FIG. 1, a typical hot swap drive setup is shown for coupling a host system 10 to a SCSI bus backplane 12. The host system 10 is coupled to the SCSI bus backplane 12 via an AUX power line 14, a command/control line 16, and a SCSI bus 18 (e.g., a 68 pin bus). The backplane 12 is coupled to drives 20 via a line 24 (e.g., 80 pin hot swappable). AUX power is provided from the host system 10 via the AUX power line 14 to the SCSI bus backplane 12, which then provides power via the line 24 to the drives 20. Command and control signals are passed via the command/control line 16 between the host system 10 and the SCSI bus backplane 12 for issuing commands and for controlling the drives 20. Information, for example, data, may be sent between the host system 10 and the drives 20 via the line 24 through the SCSI bus backplane 12, and then via the SCSI bus 18. The termination signal is sent via the SCSI bus 18 from the host 10 to the SCSI bus backplane 12 for SCSI bus termination. SCSI bus signals originating in the drives 20, for example, status information regarding the drives 20, as well as status information regarding the SCSI bus backplane 12, may be sent back to the host system 10 via the SCSI bus 18.

Functional testing of the performance characteristics of the SCSI bus backplane should be performed because of the important role the backplane plays in the SCSI system. Testing may be extremely important for quality control purposes when performed in a manufacturing environment, and test speed is a factor that should be as short as possible. In testing the SCSI bus backplane 12, the backplane 12 is typically disconnected and a new or another backplane 12 is reconnected to the host system 10 in a test setup. This procedure interrupts operation of the host system 10. The drives 20 that are present at the connectors, for example, those coupled to the line 24 and the SCSI bus backplane 12, must be spun down for disconnection and reconnection. Each time the backplane 12 is replaced for testing, however, the host system 10 has to be re-booted to re-establish the (BIOS) recognition of the drive type and the number of active drives. Such interruptions may unnecessarily add to testing time.

Therefore, there is a need to provide a system for functionally testing SCSI bus backplanes that also avoids the potential disadvantages set forth above.

SUMMARY OF THE INVENTION

In one aspect of the present invention, an apparatus having coupled drives, the apparatus used in testing a bus backplane with a host computer, is provided. The apparatus includes a backplane drive interface coupled between the host computer and the bus backplane to: receive power, command/control information, and bus information from the host computer; deliver a portion of the received power, a portion of the command/control information, and a portion of the bus information to the bus backplane, support the drives; and functionally test the bus backplane in response to signals received from the host computer.

In another aspect of the present invention, an apparatus having coupled drives, the apparatus used in testing a bus backplane with a host computer, is provided. The apparatus includes circuitry coupled to receive power, command/control information, and bus information from the host computer and to deliver a portion of the power, a portion of the command/control information, and a portion of the bus information to the bus backplane. The apparatus also includes circuitry coupled to facilitate exchange of the bus backplane with a next bus backplane without powering down the drives.

In another aspect of the present invention, a method of testing a bus backplane in a system having a host computer and drives is provided. The method includes: coupling a backplane interface between the host computer and the bus backplane; receiving power, command/control information and bus information from the host computer at the backplane interface; delivering a portion of the received power, a portion of the command/control information, and a portion of the bus information from the backplane interface to the bus backplane; supporting the drives with the backplane interface; and functionally testing the bus backplane in response to signals received from the host computer.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In what follows, because the operation and structure of the SCSI bus backplane 12 are known in the art, specific details of the operational features and structure of the backplane 12 will only be discussed to the extent necessary to help describe the backplane interface 30, the systems in which the interface 30 is included to test the backplane 12, and the functional testing of the backplane 12. Moreover, because functional testing of the backplane 12 is known in the art, the specific protocols and procedures for such testing will only be discussed to the extent necessary to help describe the backplane interface 30 and the systems in which the interface 30 is included to test the backplane 12.

Figure 2:
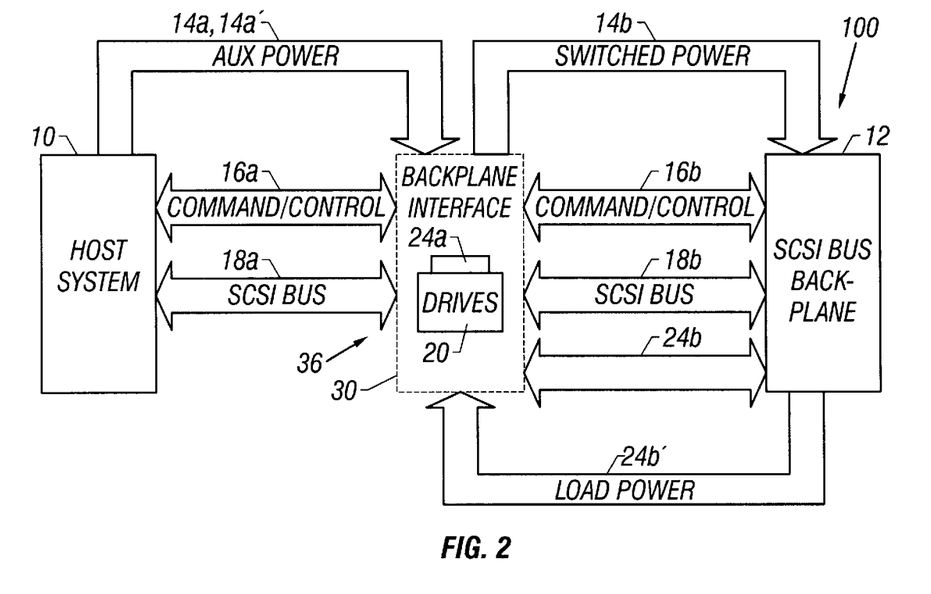
FIG. 2 is a block diagram of a SCSI hot swap bus backplane test system in accordance with an embodiment of the invention.

Referring now to FIG. 2, a block diagram is shown of a system 100 that may be used to functionally test the SCSI bus backplane 12 (referred to as the device under test or "DUT") in accordance with an embodiment of the invention. The system 100 includes the host system 10, a backplane interface 30, and the SCSI bus backplane 12 to be tested. The backplane interface 30 is coupled between the host system 10 and the SCSI bus backplane 12. The backplane interface 30 is coupled to the host system 10 via AUX power lines 14a and 14a' (similar to the line 14), a command/control line 16a, and a SCSI bus 18a, for example, a 68 pin bus (similar to the line 18). The inclusion of the line 14a' in addition to the line 14a is representative of the AUX power typically being provided by a two port cable. Other cabling implementations in other embodiments are possible. In the system 100, two SCSI bus sections or lines, the section or line 18a and a section or line 18b (e.g., 68 pin bus sections), replace the standard SCSI bus 18 (FIG. 1) that couples the host system 10 and the SCSI bus backplane 12 to couple the backplane 12 to the interface 30, and the host system 10 to the interface 30, respectively. All the system 100 SCSI communications signals that are typically sent between the host system 10 and the backplane 12 are passed via the lines 18a and 18b through the backplane interface 30. The backplane interface 30 is also coupled to the SCSI bus backplane 12 via a switched power line 14b, a command/control line 16b, a bus extension line 24b (e.g., an 80 pin line), and a load power line 24b' (discussed below). (Note that the line 24b' has been separated out from the line 24b only for illustration purposes and convenience in describing the drawings, and in actual implementations and other embodiments, it is included in the line 24b. Power signals, such as the 5-volt signals that power the control logic (not shown) in the drives 20 and the 12 volt signals that power the drive motors (not shown) in the drives 20, are routed to the backplane interface 30 via the line 14a.

In the system 100, the drives 20 are not directly coupled to the SCSI bus backplane 12, as was the case in the system in FIG. 1. Instead, as generally shown in FIG. 2, the drives 20 are each coupled to the backplane interface 30 via a SCSI drive bay connector 24a (e.g., an 80 pin connector or line) in a drive bay section 36 of the backplane interface 30. The connector 24a couples the backplane 12 to the interface 30 and the line 24b couples the drives 20 to the interface 30, and the connector 24a and the line 24b (and 24b') both replace the standard line 24 shown in FIG. 1.

The command/control lines 16a and 16b carry signals normally transferred by the line 16 in the system in FIG. 1, which include "I²C" serial data for interrogating the operational status of the backplane 12 along with other discrete signals for supervision of the backplane interface 30. The lines 16a and 16b are unique in the application of the system 100 and may become communications sub-components should the system 100 be adapted to other functional test configurations. These scenarios and the other signals propagated via the lines described above will be discussed in greater detail below.

In the system 100 in FIG. 2, the separation of the backplane 12 from the host system 10 (unlike in the system in FIG. 1) by the interface 30 provides a versatile configuration for a test setup capable of functionally testing the SCSI bus backplane 12. The interface 30 provides the electronic test support to readily disconnect and connect the SCSI bus backplane 12 from the host system 10 for replacement with another (new or next) backplane 12 for individual DUT functional testing. This configuration avoids interruption of the operation of the host 10 and avoids spinning (powering) down the cluster of drives 20 present at the SCSI bus interface 30 because the drives 20 are coupled to the interface 30 instead of being directly coupled to the backplane 12. Complete isolation between the host system 10, the backplane 12, and the drives 20 during power cycling permits the exchange without damage to the host system 10, the backplane 12 or the drives 20. The system 100 does not have to be rebooted for recognition of the drives 20 by the BIOS each time the backplane 12 is replaced, or to establish the number of the drives 20 that are active (i.e., being used) to functionally test each backplane 12 after replacement. Test time is reduced accordingly. Moreover, expanded test coverage is provided in the system 100 through additional integrated test points and measurement features (not shown). The system 100 may be adapted to functionally test other SCSI bus backplanes containing different SCSI drive configurations, as well.

Figure 3:
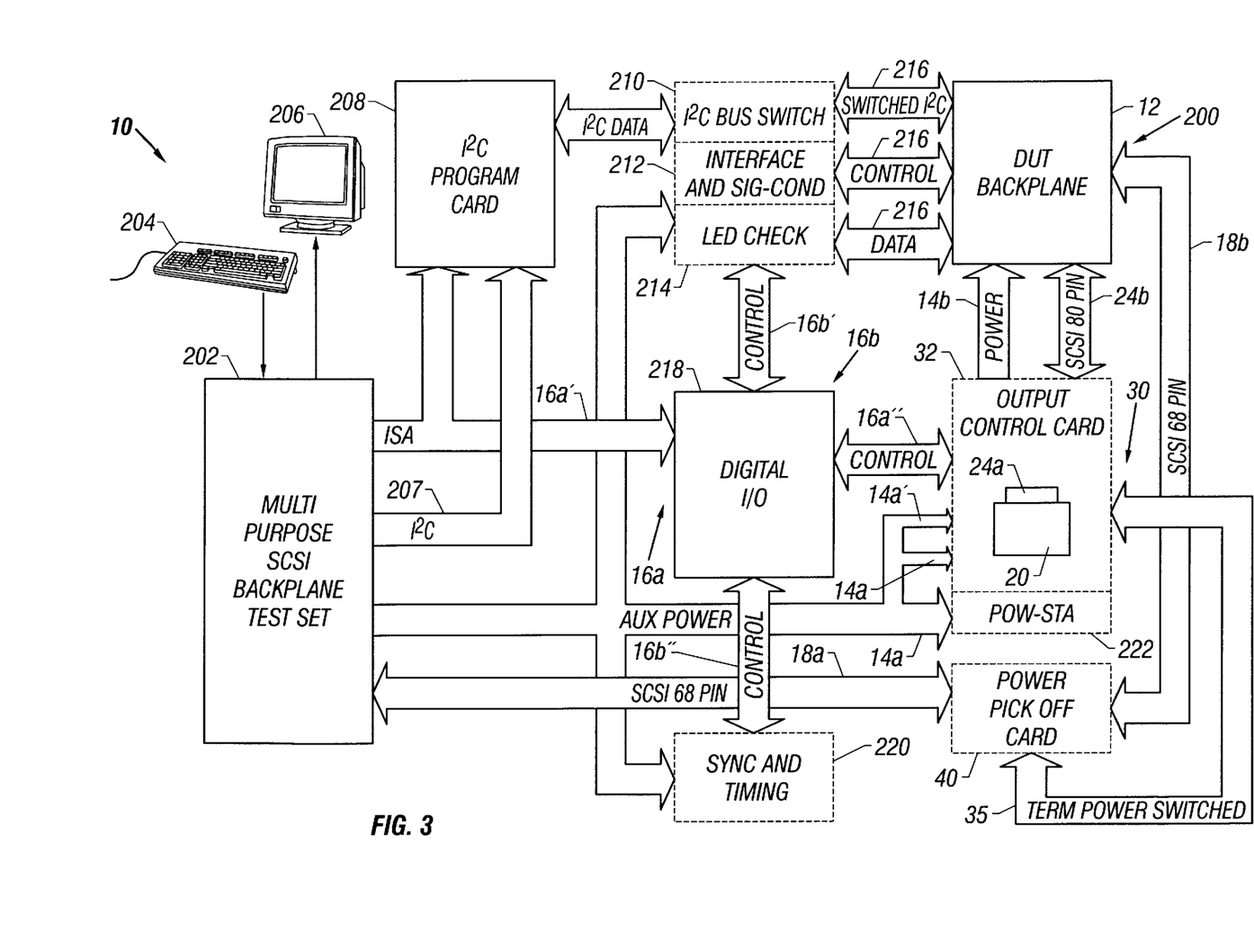
FIG. 3 is a block diagram of a possible implementation of a SCSI hot swap bus backplane test system in accordance with an embodiment of the invention.

The SCSI bus backplane interface 30 may be incorporated in a universal SCSI backplane tester ("tester") 200 that is shown in block diagram form in FIG. 3, in accordance with an embodiment of the invention. In the tester 200, the interface 30 enables bus communications (test data) to be actively exercised between the host system 10, the backplane 12, and the individual SCSI drives 20 during testing or after power has been removed and then restored to the new or next (or any one) backplane 12. Exchange and functional testing without loss of identification of the drives 20, without having to re-spin the drives 20 up, and without having to run through re-booting the host system 10 is enabled by the interface 30 in the system 200 for the same type backplane 12, just as in the system 100. The ability to test the backplane 12 without the overhead of re-booting the host system 10 saves substantial testing time, thus increasing computer manufacturing or assembly throughput. Moreover, the interface 30 will accommodate up to the typical six of the drives 20, or up to twelve (or more) of the drives 20 if two (or more) of the interfaces 30 are cascaded (not shown). Other embodiments could be employed to handle more than twelve of the drives 20. Analog and digital measurement and fault insertion ("ADF") capabilities of the interface 30 should also improve test coverage of the backplane 12 in the system 200, as discussed below. Various circuitry components of the tester 200 will now be discussed before providing additional detail about the interface 30.

Referring to FIG. 3, the system 200 includes the host system 10 having a multi-purpose SCSI backplane test set 202 (e.g., a computer motherboard and SCSI controller chips) coupled to an input device 204 (e.g., a mouse or a keyboard) and a display 206 (e.g., a computer monitor). Software may be brought in off a network (not shown) or be resident in the host system 10 to functionally test the backplane 12. The system 200 also includes the command/control line 16a, which includes an ISA bus 16a' on the motherboard, digital I/O circuitry 218 (described below), and a command/control line 16a", as shown in FIG. 3. The line 16a includes the digital I/O circuitry 218 because the system 200 is an adaptation of the system 100 in another functional test configuration, as discussed above. The system 200 further includes the line 16b, which shall now be labeled as 16b' and 16b", and also includes the digital I/O circuitry 218 for similar reasons. The adaptation to the functional tester that is the system 200 provides for the lines 16a and 16b to be bundled with other signal lines. The primary elements and method of implementation of the lines 16a and 16b make the transformation to the system 200 structure reasonably easy. The introduction of the digital I/O circuitry 218 permits the adaptability of the basic system 100 in the system 200. Hence, to maintain a level of traceability in the drawings, the line 16a shall now be labeled as the lines 16a' and 16a", and the line 16b as the lines 16b' and 16b", both the lines 16a and 16b including the digital I/O circuitry 218.

The system 200 also includes an I²C bus 207 coupling the host system 10 to a serial communications card 208 (e.g., a universal programmable, off-the-shelf, plug-in, I²C program card), and completes host communication. The command/control lines 16a', 16a", 16b', 16b", and the I²C bus 207 provide a pathway for information (e.g., command or control information, data and addresses, i.e., I/O information) to be communicated from the host system 10 to the interface 30 or the backplane 12. For example, circuitry, shown in FIG. 3, coupled to the I²C bus may receive information (e.g., a command) to be sent from the host system 10 to the backplane 12. The serial communications card 208 is coupled to a bus switch 210 (e.g., an I²C bus switch) via a data line (e.g., an I²C data line), and data is passed between the card 208 and the switch 210 to control (I²C) bus function. The bus switch 210 is coupled to the backplane 12 via a switched line (e.g., an I²C switched line), which is generally shown as being part of lines 216, and terminates the (I²C) bus. (It should be understood that the description of the lines 216 discussed herein, which are coupled to several components, is merely a description of convenience, and, in actual implementations, these components may be coupled to separate and distinct lines, or have other configurations.) The bus switch 210 must be included to disconnect the serial card 208, under control of the host system 10, from the backplane 12 during replacement with another backplane 12.

The tester system 200 further includes interface and signal conditioning circuitry 212. The interface and signal conditioning card 212 may be an amplifier that drives data signals back into a tester buffer driver (not shown) in the host system 10 via a control line, which is generally shown as being part of the lines 216, from the backplane 12 held in a test fixture (not shown). These signals may include, but are not limited to, a backplane fan (not shown) temperature and speed signals that are used to control the backplane 12 or to monitor the fan temperature and speed.

Moreover, as shown in FIG. 3, the tester 200 includes LED check circuitry 214, which is powered from the host system 10 via the line 14a. The LED check circuitry 214 is used to verify that LEDs (e.g., the fault, power, and activity or flash LEDs discussed above) and their associated drives 20 are operational. As an indication of the status of the drives 20, data signals are passed between the backplane 12 and the LED check circuitry 214 via a data line (which generally also forms part of the lines 216) for the LED check circuitry 214 to check whether these LEDs are supposed to be on or off.

The digital I/O circuitry 218, which may be an off-the-shelf card, is coupled through line 16b' to the interface and signal conditioning circuitry 212 and the LED check circuitry 214, and controls data from them. The digital I/O circuitry 218 sends signals to the host system 10 via the line 16a' to indicate whether the LEDs discussed above are working properly or not, as well as interlock check signals. Interlocks are included in the system 200 to prevent component damage in the event components, for example, the backplane 12, are disconnected improperly or at the wrong time.

The digital I/O circuitry 218 is also coupled to synchronization and timing circuitry 220, via the line 16b'', and to an output control circuitry 32 (e.g., an output control circuit card or "OCC"), via the line 16a'', that is part of the backplane interface 30 (discussed below). The synchronization and timing circuitry 220 receives power from the host system 10 via the line 14a and is primarily used to apply or disengage power from the backplane 12 at appropriate times during testing or during an exchange of the backplane 12 with the new or next backplane 12. The synchronization and timing circuitry 220 is also used to set up the interlocks to prevent system damage, turn on (or off) the termination power to the drives 20, and to turn off (or on) power to the backplane 12. The synchronization and timing circuitry 220 performs these functions in response to test signals or data sent between the backplane 12 and the host system 10, under control of the host system 10, through the digital I/O circuitry 218. The synchronization and timing circuitry 220 receives these signals via the digital I/O circuitry 218. Moreover, the synchronization and timing circuitry 220 passes control to other components (sub-elements) of the present invention, for example, to the OCC 32.

Figure 4:
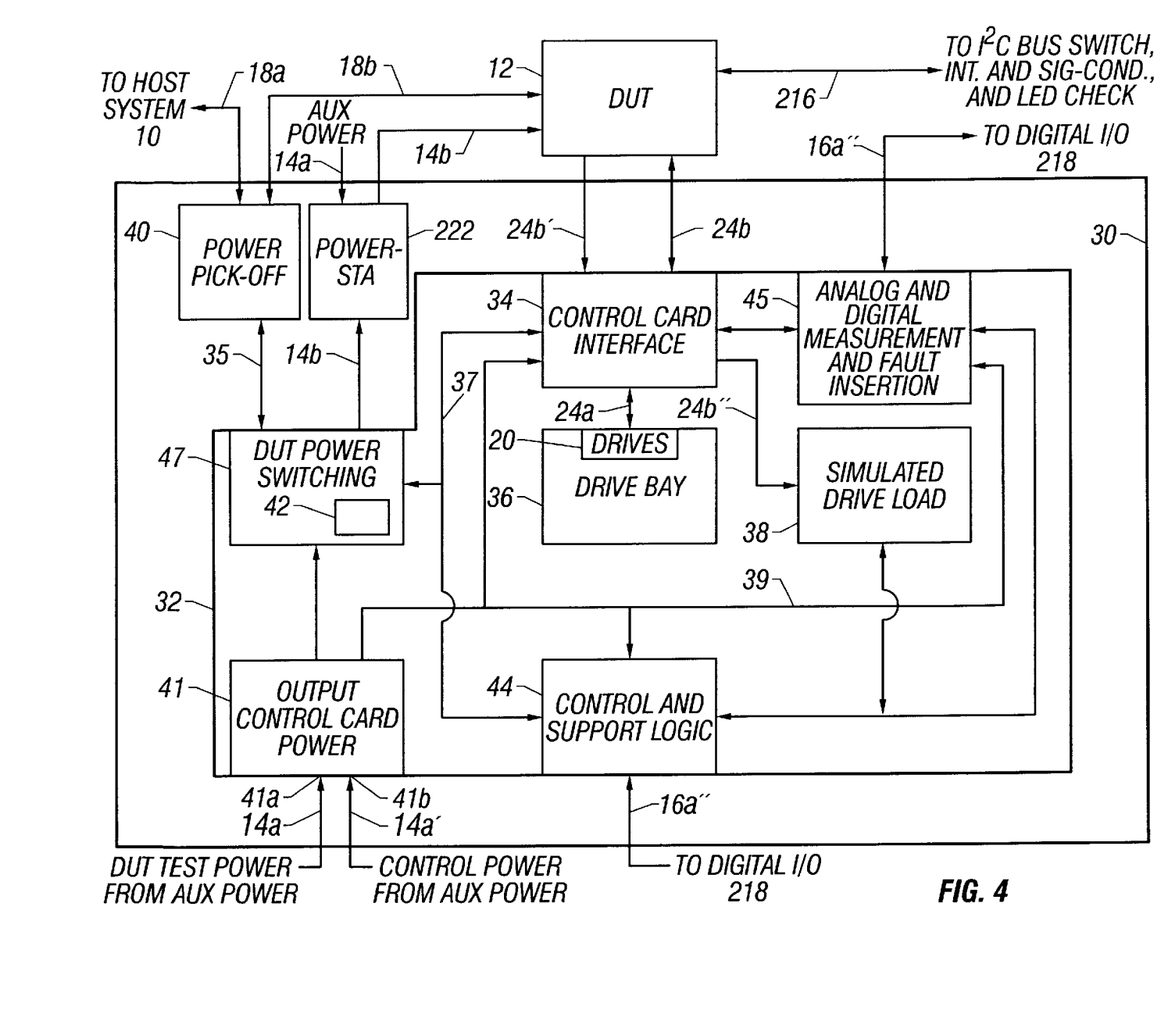
FIG. 4 is a block diagram of an apparatus used in testing SCSI hot swap bus backplanes in accordance with an embodiment of the invention.
Figure 5A:
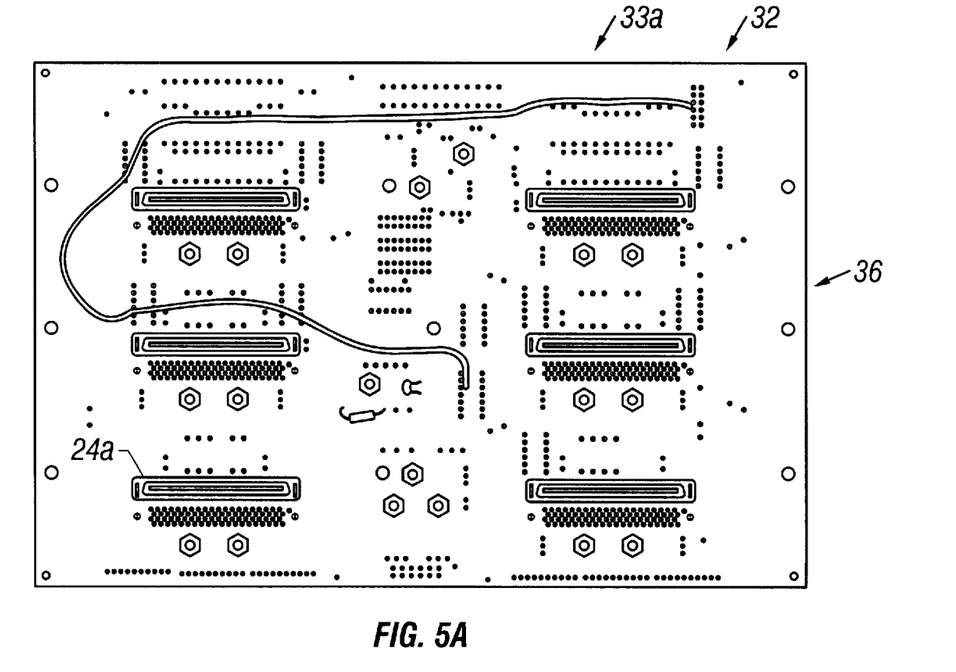
FIGS. 5a and 5b are scanned images of sides of a portion of the apparatus in FIG. 4 in accordance with an embodiment of the invention.
Figure 5B:
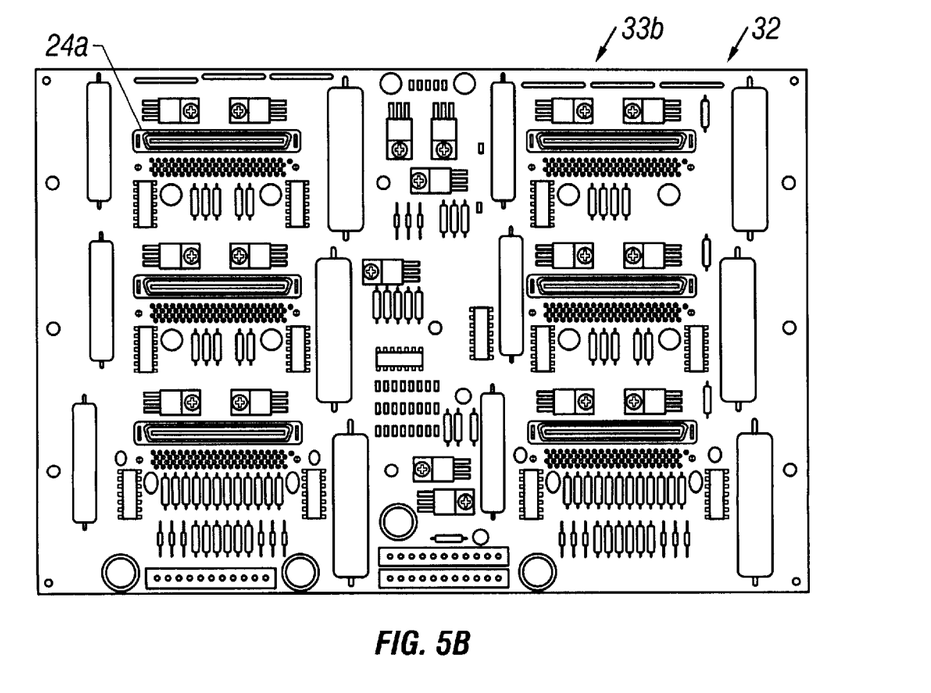

Referring to FIG. 4 in addition to FIG. 3, the OCC 32 is shown. The OCC 32 contains all of the features of the interface 30 except for a power pick-off assembly 40 and a power-sta (power status) circuitry 222 (both discussed below). The OCC 32 is designed to fit into the host system 10 (e.g., a server) for easy mating with the drives 20. A drive bay 36 in the OCC 32 provides the mechanical holding required to secure the drives 20 in place and to have the drives 20 mate with the connectors (e.g., with the connector 24a through which an OCC power line 39 provides power, as discussed below) in the OCC 32. The connector 24a (e.g., a feedthrough connector) from a drive bay side 33a (see FIG. 5a) of the OCC 32 to a backplane side 33b (see FIG. 5b) permits signals to be intercepted from the host system 10 and redirected for the tester system 200 operation. These signals include the drive power, drive identification, drive present, drive activity, and power LED signals. The line 24b, which may be on the backplane side 33b of the OCC 32, is cabled to the backplane 12 by means of the test fixture (not shown), and this cabling completes the drive 20-to-bus 18a circuit.

Power is supplied to the OCC 32 (and the interface 30) and the backplane 12 through a power share system from the host system 10 via the lines 14a and 14a'. The line 14a' has been introduced in FIG. 3 because the line 14a (e.g., AUX power) may be a two channel power bus, as mentioned above, with the second channel 14a' being dedicated for DUT test power. Such an implementation provides a high degree of isolation between different power share input ports, 41a and 41b, and the host system 10 circuitry. Other power share embodiments are possible. Referring to FIG. 4, the power received via the lines 14a and 14a'' at the ports 41a and 41b of the OCC 32 (i.e., DUT test power and control power) is filtered by a filter 41 on the OCC 32 (e.g., a capacitance filter). The filter 41 distributes power from the port 41b to control and a support logic circuitry 44 (discussed below), to ADF circuitry 45, to control card interface circuitry 34 (the main junction point between the different components in the backplane interface 30 sub-system), and to the physical drives 20 (through the drive bay 36 and a control card interface circuitry 34, which is discussed below). None of this power is used to run the backplane 12. The backplane 12 power (DUT test power) is instead received via the line 14a through the port 41a. The filter 41 also filters this power. The separate power share port 41a is used to operate the backplane 12 and is isolated from the OCC 32 power supplied to the circuitry 44, 45, and 34. This power is fed to the backplane 12, under control of the host system 10, from the OCC power filter 41 through switching controlled by high powered switching devices 42 (discussed below), which may be metal-oxide-semiconductor field effect transistors (MOSFETs), in a DUT power switching circuitry 47 (included in the OCC 32).

With power to the backplane 12 as set forth above, to operate and test the backplane 12 at a functional level, the backplane 12 must sense and react to a load. Normally, as shown in FIG. 1, the drives 20 are connected to the backplane 12 and receive power through the backplane 12 via the connector 24. The interface 30, however, redirects similar power received via the line 24b' at the control card interface circuitry 34 from the backplane 12 to resistive loads 38 via a line 24b''. High power (e.g., MOSFET) switches from among the switches 42 that switch the simulated drive loads 38 are integrated into the interface 30 in the DUT power switching circuitry 47. The resistive loads 38 may also be switched in or out of the system 200 circuitry for fault insertion testing of the backplane 12. The physical drives 20 located in the drive bay 36 and coupled to the connector 24a are powered from the control card interface 34 through the connector 24a via the line 39, which is coupled to the output control card power filter 41. Such power handling and the resistive loads 38 enable the backplane 12 to be "fooled" (i.e, no problem is detected) in that there is no indication that the loads 38 are not the drives 20 themselves. Such an implementation, where, as far as the backplane 12 is concerned, the drives 20 are coupled to it, allows testing of a signal from the backplane 12 that indicates that the drives 20 are present. This may be done by switching power on and off to the loads 38 from the backplane 12 to test the drive present indication signal through the I²C bus. This signal normally indicates that the drives 20 are present.

The separate power share port 41a and the filtering by the filter 41 permit the power switches 42 to switch power on and off to the backplane 12 under control of the host system 10. The power sharing and filtering permits the termination power from the SCSI bus 18a to be intercepted by the power pick-off circuitry 40 included in the interface 30, without disturbing the operation of the physical drives 20 or corrupting the SCSI bus sections 18a or 18b. The power pick-off circuitry 40 intercepts the termination voltage from the SCSI bus section 18a, and routes it via a line 35 (FIGS. 3 and 4) to a dedicated one (not shown) of the switches 42 in the DUT power switching circuitry 47 in the OCC 32. This voltage is removed from the bus section 18b during the backplane 12 replacement phase between tests. It is re-established to the new or next (or the same) backplane 12, the SCSI line 24b, and the connector 24a after the new or next (or the same) backplane 12 is secured in the holding fixture for functional testing.

The power pick-off circuitry 40 may be mounted in-line with the SCSI bus sections 18a and 18b, as shown in FIGS. 3 and 4. It may be desirable to implement the circuitry 40 as a separate card from the OCC 32 (e.g., as shown in FIG. 4) to reduce the possibility of unwanted noise affecting the switches 42, although other embodiments are possible. Switching of the termination power to the OCC 32 occurs when correct control signals and sequence are present at the inputs of the logic gates (not shown) that drive the switches 42 and the power pick-off circuitry 40.

Referring again to FIGS. 3 and 4, the power-sta circuitry 222 is a sub-function of the OCC 32 and is used to monitor power leaving the OCC 32 through the line 14b before it reaches the backplane 12. Fuses and warning LEDs (not shown) provide the necessary short circuit protection between the backplane 12 and the DUT power switching 47 functions within the OCC 32. Very much as with the power pick-off circuitry 40, it may be desirable to implement the circuitry 222 as a separate card from the OCC 32 (e.g., as shown in FIG. 4) to reduce the possibility of noise and for convenience as to the physical location of the fuses and the warning LEDs, although other embodiments are possible.

Control signals (e.g., the correct control signals discussed above) are generated externally to the OCC 32 (i.e., they are generated by the host system 10 and the digital I/O circuitry 218), and can be implemented manually with prompts to a user of the host system 10, or automated in the host system 10. The presence of the correct control signals and sequence is determined by input signals from the digital I/O circuitry 218 to the control and support logic circuitry 44 from the host system 10. If these correct control signals and sequence are present, signals are carried by the line 37 to the DUT power switching circuitry 47 from the control and support logic circuitry 44 that enable the DUT power switching circuitry 47 to receive the termination power from the power pick-off circuitry 40. The control and support logic circuitry 44 of the interface 30 includes miscellaneous gates and discrete components (not shown) that adjust logic levels and steady state conditions. These gates and discrete components may also be used to simulate drive present or drive fault signals.

In the system 200, expanded test coverage is provided, as mentioned above for the system 100, through additional integrated test points and measurement features, for example, by the circuitry 44 and 45 in FIG. 4. With the ADF circuitry 45, the interface 30 is able to measure voltages from the backplane 12 during testing, and to determine if the voltages are above selected levels. Operational amplifiers (not shown) are configured in a comparator mode in the ADF circuitry 45 and set a digital flag indicating a failure when these voltages do not equal or exceed the selected test levels. For example, the host system 10 can tell the backplane 12, through the ADF circuitry 45, that one of the drives 20 has been removed, even though it really has not. The ADF circuitry 45 can also measure whether an expected error voltage is properly above a threshold value. Switches (not shown) that would normally (e.g., in the system in FIG. 1) be used for each 5 volt and 12 volt line originating on the backplane 12 to power the drives 20 may also be measured using the ADF circuitry 45. (Note that, although the drives 20 are not powered by the backplane 12 in the systems 100 and 200, the backplane 12 still attempts to send the 5 and 12 volt power to them, but these power signals are redirected to the simulated drive loads 38.) The ADF circuitry 45 (e.g., its comparators) may also be used to check for <12 volt and <5 volt threshold measurement to determine if power has actually been turned off to the backplane 12 for exchanging the backplane 12. The interface 30 is also capable of injecting signals for drive present, LED status, and load control into the backplane 12 from the ADF circuitry 45 to determine the response of the backplane 12.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A backplane drive interface, having coupled drives, for use in testing a bus backplane with a host computer, comprising:
    a first circuit coupled to receive power, command/control information, and bus information from the host computer, and deliver a portion of the received power, a portion of the command/control information, and a portion of the bus information to the bus backplane;
    a switching circuit coupled to said first circuit for facilitating a disconnection of the host computer without powering down the drives for exchanging of the bus backplane or a component on the bus backplane.

2. The backplane drive interface of claim 1, wherein the bus backplane comprises a small computer system interface (SCSI) bus backplane.

3. The backplane drive interface of claim 1 comprises circuitry coupled to the bus backplane to exchange information with the bus backplane.

4. The backplane drive interface of claim 1 comprises a drive bay to couple the drives.

5. The backplane drive interface of claim 1 comprises circuitry coupled to simulate drive present and drive fault signals.

6. The backplane drive interface of claim 3 further supplies power from the host computer to the drives independent of the bus backplane.

7. The backplane drive interface of claim 3, further comprising circuitry coupled to perform analog and digital measurement, and fault insertion testing of the bus backplane.

8. The backplane drive interface of claim 3, wherein signals indicative of the status of the bus backplane are intercepted.

9. The backplane drive interface of claim 8, wherein the signals comprise fault light emitting diode (LED) signals.

10. The backplane drive interface of claim 1 further having coupled to it loads and circuitry that delivers power to the loads.

11. The backplane drive interface of claim 10, wherein the loads comprise simulated drive loads, and wherein the circuitry that delivers power to the loads simulates delivery of power to real drives.

12. The apparatus, having coupled drives, for use in testing a bus backplane with a host computer, comprising:

circuitry coupled to receive power, command/control information, and bus information from the host computer and to deliver a portion of the power, a portion of the command/control information, and a portion of the bus information to the bus backplane; and circuitry coupled to facilitate exchange of the bus backplane with a next bus backplane without powering down the drives.

13. The apparatus of claim 12, wherein the bus backplane comprises a small computer system interface (SCSI) bus backplane.

14. The apparatus of claim 12, further comprising a drive bay to couple the drives.

15. The apparatus of claim 12, further comprising circuitry coupled to simulate drive present or drive fault signals.

16. The apparatus of claim 12, wherein the portion of the power is delivered as switched power to the bus backplane.

17. The apparatus of claim 12, wherein the bus backplane is exchanged without having to spin down the drives.

18. The apparatus of claim 12, wherein the bus backplane is exchanged without losing drive identification.

19. The apparatus of claim 12, wherein the bus backplane is exchanged without having to reboot the host computer.

20. The apparatus of claim 12, further comprising circuitry coupled to simulate drive load.

21. The apparatus of claim 20, wherein the circuitry coupled to simulate drive load comprises resistive loads that can be switched for fault insertion testing of the bus backplane.

22. The apparatus of claim 12, wherein the circuitry coupled to receive comprises circuitry coupled to intercept power from the host computer while the bus backplane is exchanged, and to re-route it to the next bus backplane.

23. The apparatus of claim 22, wherein the power is intercepted away from the bus backplane.

24. The apparatus of claim 22, wherein the intercepted power is routed to a switch while the bus backplane is exchanged.

25. The apparatus of claim 24, wherein the switch comprises a metal-oxide-semiconductor field effect transistor (MOSFET).

26. The apparatus of claim 22, wherein the intercepted power is re-routed to the next bus backplane once the exchange is complete.

27. A method of testing a bus backplane in a system having a host computer and drives comprising:

coupling a backplane interface between the host computer and the bus backplane;

receiving power, command/control information and bus information from the host computer at the backplane interface;

delivering a portion of the received power, a portion of the command/control information, and a portion of the bus information from the backplane interface to the bus backplane;

supporting the drives with the backplane interface; and disconnecting the host computer from the backplane at the backplane interface without powering down the drives for exchanging of the bus backplane or a component on the bus backplane.

28. The method of claim 27, further comprising intercepting a termination signal provided by the host computer away from the back backplane.

29. The method of claim 27, wherein the supporting drives comprises coupling the drives to the backplane interface instead of to the bus backplane.

30. The method of claim 27, further comprising simulating a presence of the drives at the bus interface by simulating drive loads.

31. The method of claim 27, further comprising exchanging the bus backplane without requiring the host computer to recognize the drives.

* * * * *

UNITED STATES PATENT AND TRADEMARK OFFICE
CERTIFICATE OF CORRECTION

PATENT NO.    : 6,067,506
DATED         : May 23, 2000
INVENTOR(S)   : Goldys et al.

Page 1 of 1

It is certified that error appears in the above-identified patent and that said Letters Patent is hereby corrected as shown below:

<u>Title page,</u>
Item [75], Inventors, delete "John J. Goldys; Charles T. Bloomer, both of Beaverton, Oreg." and insert -- John J. Goldys, Beaverton; Charles T. Bloomer, Aloha; both of Oreg. --.

Signed and Sealed this

Thirty-first Day of December, 2002

JAMES E. ROGAN
*Director of the United States Patent and Trademark Office*